United States Patent [19]

Iwatani et al.

[11] 4,200,532

[45] Apr. 29, 1980

[54] WASTEWATER TREATMENT APPARATUS

[75] Inventors: Akitoshi Iwatani, Marugame; Masataro Takuma, Kagawa, both of Japan

[73] Assignee: Ishigaki Kiko Co., Ltd., Tokyo, Japan

[21] Appl. No.: 2,979

[22] Filed: Jan. 12, 1979

[30] Foreign Application Priority Data

Jun. 7, 1978 [JP] Japan .......................... 53/78352[U]
Jul. 22, 1978 [JP] Japan .................................. 53/89598

[51] Int. Cl.² ............................................ B01D 33/10
[52] U.S. Cl. .................................. 210/151; 210/157; 210/161; 210/402
[58] Field of Search .................. 210/150, 151, 242 A, 210/242 R, 220, 157, 161, 402; 261/92, 95; 55/233, 234, 247; 422/265, 266

[56] References Cited

U.S. PATENT DOCUMENTS 3,543,937 12/1970 Choun .................................. 210/150
3,956,127 5/1976 Holmberg .......................... 210/150

Primary Examiner—Frank Sever

[57] ABSTRACT

An arrangement for treating wastewater containing soluble organic matter through the proliferation of aerobic microorgnisms to purify the wastewater. In an apparatus having a wastewater tank, a water pervious drum rotatably mounted in the tank and partially submerged in wastewater therein, and a multiplicity of biological contactors packed in the drum, the improvement comprising the biological contactors being of hollow structure, each having at least two small openings, a subsidiary biological contactor being provided in the interior of each biological contactor where required, the contactors being compactly packed in the drum so as to be prevented from movement therein.

9 Claims, 13 Drawing Figures

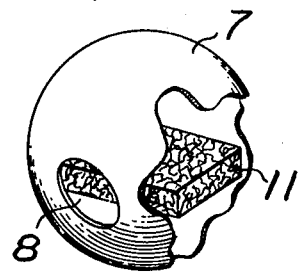
FIG. 11
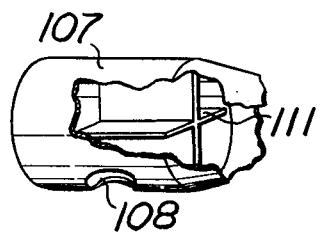
FIG. 12
FIG. 13
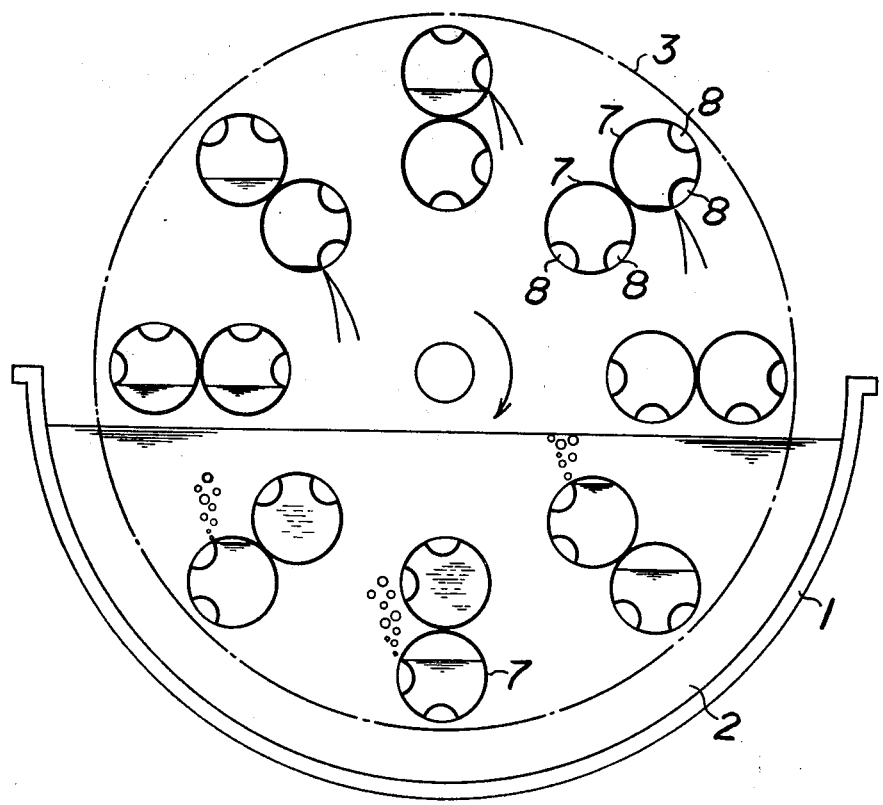

WASTEWATER TREATMENT APPARATUS

BACKGROUND AND SUMMARY

This invention relates to apparatus for treating waste water.

Generally, treatment of waste water containing soluble organic matter is done by decomposing the organic matter through the proliferation of microorganisms. Such treatment is referred to as biological treatment, and there are two basic methods of treatment, one known as activated sludge process and the other as trickling filtration process.

The activated sludge process is effective for use at such facilities as sewage disposal plants where mass treatment operation is required, but it involves maintenance and control difficulty. The trickling filtration provides ease of maintenance and control, but on the other hand it has a disadvantage in that the rate of BOD removal it affords is relatively low.

A known improved arrangement for biological treatment of waste water is to utilize rotating biological contactors (typically in the form of discs). Known as rotating biological contactor process, it provides a combination of advantages of both activated sludge process and trickling filtration process, such as ease of maintenance and control, high treatment efficiency, and smaller plant scale required. Hence, the rotating biological contactor process has been in wide use and thus far a number of improvements on it have been proposed.

However, with various rotating contactor systems so far developed there has still remained room for improvement in respect of their performance.

Accordingly, it is the primary object of this invention to provide a wastewater treatment system employing a rotating drum which provides a larger filtration area, and hence higher treatment efficiency, than any known treatment arrangement utilizing rotating biological contactors, typically discs. In the rotating drum system according to the invention, the drum incorporates a multiplicity of biological contactors of a specific configuration designed to provide a larger filtration area than discs. More concretely, a wastewater treatment apparatus in accordance with the invention comprises a wastewater tank, a water pervious drum rotatably horizontally fixed mounted in the tank and submerged about one half of its diameter in wastewater in the tank, and a multiplicity of biological contactors packed in the drum, wherein the drum, at least its peripheral wall portion, is constructed of porous plate or woven metal wire so as to be water pervious and the biological contactors are of hollow structure, each having at least two small openings, and are compactly and securely packed in the drum so as to be prevented from movement therein.

In accordance with the invention, the biological contactors packed in the drum are of thin-walled hollow structure. This provides each contactor with a relatively larger surface area of contact with wastewater and thus facilitates wastewater purification. It provides another advantage that the contactors are light in weight, which fact means reduced power requirement for operation. Further, in the wastewater treatment arrangement of the invention, the biological contactors of hollow structure are each provided with at least two small openings and are compactly and securely packed in the drum so as to be prevented from movement therein. This assures that as the drum rotates, wastewater and air go in and out of the hollow portion of the contactors, resulting in effective contact between wastewater and air so that the activity of aerobic microorganisms is stimulated. The fact that the biological contactors are immovable packed in the drum is also advantageous in that it prevents the growth accumelated on the contactor surface from being split therefrom during the rotation of the drum.

A further advantage of the wastewater treatment apparatus of the invention resides in the fact that since the biological contactors packed in the drum are hollow, it is possible to provide a subsidiary biological contactor of a suitable configuration in the interior of each contactor to obtain increased growth accumulation surface and increased area of contact of air and wastewater.

Other feature, objects and advantages of the invention will become apparent from the following detailed description of embodiments with reference to the accompanying drawings.

Figure 8:
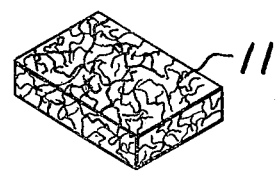
Figure 9:
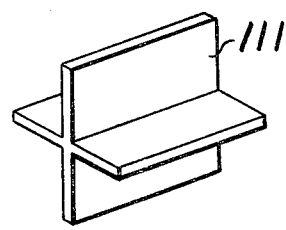
Figure 10:
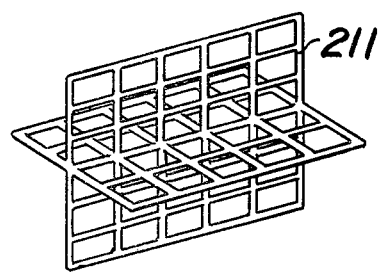

p FIGS. 8 to 10, inclusive, are perspective views showing examples of subsidiary biological contactor according to the invention.

FIGS. 11 and 12 are partially cutaway perspective views of biological contactors incorporating a subsidiary biological contactor.

FIG. 13 is a diagrammatical representation showing trickling and aeration process of biological contactors.

DESCRIPTION OF PREFERRED EMBODIMENTS

Figure 1:
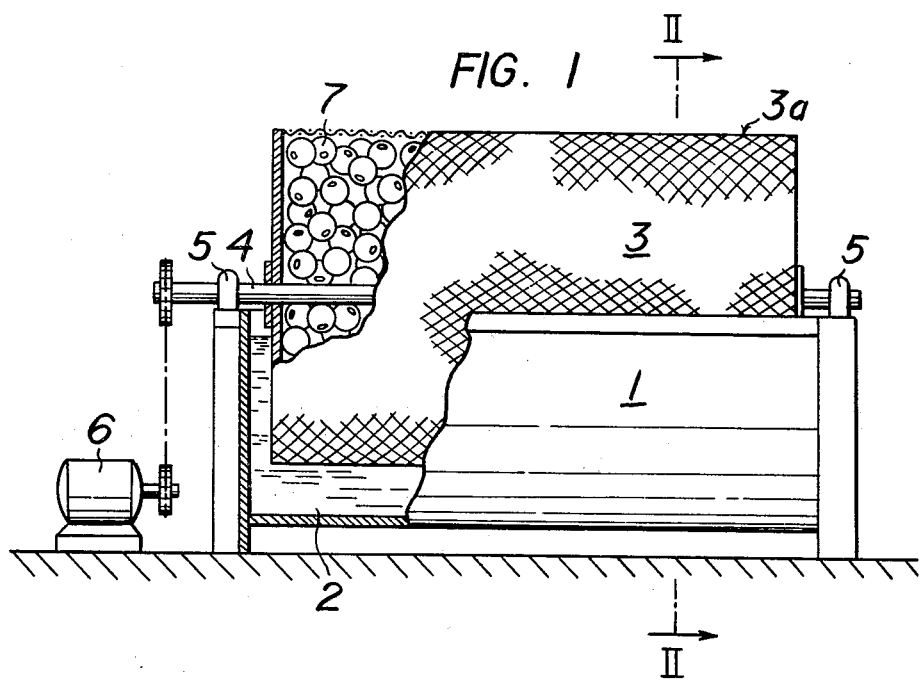
FIG. 1 is a front elevation of a wastewater treatment apparatus embodying this invention, with a wastewater tank and a drum, both partially cut away.
Figure 2:
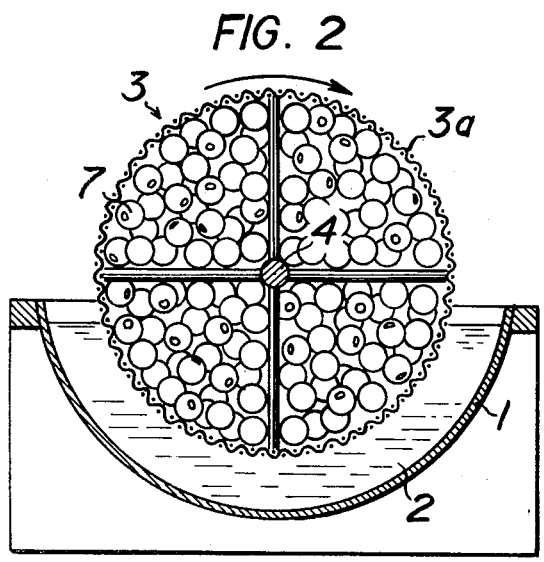
FIG. 2 is a sectional view taken on line II—II in FIG. 1.

Referring now to the embodiment of the invention shown in FIGS. 1 and 2, a drum 3 is rotatably horizontally mounted in a wastewater tank 1, being submerged in wastewater 2 about one half of its diameter. The drum 3 is rotatable supported in shaft bearings 5 on the tank. A motor 6 is connected to a shaft 4 to rotate the drum 3 at a suitable peripheral velocity.

The drum 3, at least its peripheral wall portion 3a, is constructed of woven metal wire as illustrated in FIGS. 1 and 2 or of porous plate (not shown) so as to be water pervious, so that the drum 3, submerged in wastewater about half its diameter, permits wastewater to freely go in and out of the interior of its submerged portion as it rotates. A multiplicity of biological contactors 7 as described hereinbelow are packed in the drum 3. Biological contactors 7 are of thinwalled hollow structure, formed of synthetic resins such as polyethylene, and about the size of pingpong ball, each having two small openings 8,8 provided on its periphery. The two openings 8,8 are disposed on the periphery of the biological contactor 7 at an angle of about 90° ($\theta = 90°$) from the center of the contactor 7. The angle θ between openings 8 and 8 need not be 90°, and yet preferably it should be within the range of 80°-100°. The reason for this will be apparent from the function of the small openings 8,8 (which permit wastewater to go in and out of the contactor 7) as explained hereinafter.

Figure 5:
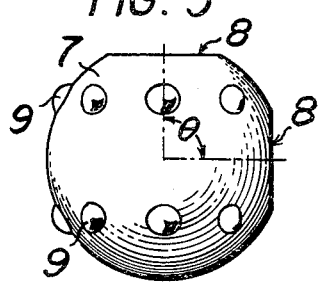
FIGS. 5 and 6 are front elevations showing other forms of biological contactors according to the invention.
Figure 6:
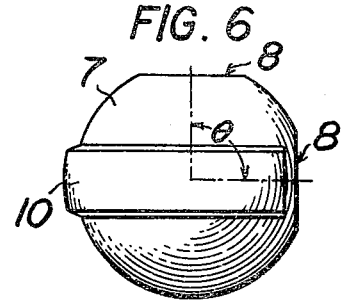

Biological contactors 7 are compactly packed in the drum 3 so as not to move, therein as the drum rotates. In order to assure that the ball-shaped biological contactors 7 will not move in the drum 3, it is desirable to provide on the outer periphery of each contactor 7 a plurality of projections 9 of such type as shown in FIG. 5 or a raised strip 10 of such form as shown in FIG. 6.

The operation of the wastewater treatment apparatus embodying the invention will now be explained. When wastewater 2 is fed into the wastewater tank 1 and the drum 3 is rotated, the drum 3, partially submerged in wastewater 2, is subject to passage of wastewater 2 into the interior of its submerged portion, whereupon individual biological contactors 7 packed in the drum 3 are also subject to entry of wastewater 2 into them through one of the small openings 8. As the drum 3 rotates, relative position of two small openings 8,8 on each contactor 7 changes, and wastewater enters the contactor 7 through the lower positioned opening 8, while air present in the contactor 7 is discharged through the upper positioned small opening 8. This process continues until the upper positioned small opening 8 is submerged in wastewater 2. When the small openings 8,8 are both submerged, a small amount of air is still left in the contactor at a level above the small openings 8,8, whichever is in higher position, but the air so left is discharged into wastewater as the drum 3 rotates to change the relative position of the small openings 8,8. Each biological contactor which has thus discharged air from and received wastewater into it rises above the wastewater level in the tank 1 as the drum 3 rotates. Then, flow-out of wastewater through the lower positioned small opening 8 takes place, but not at a time. With gradual change of the relative position of small opening 8 due to the rotation of the biological contactor 7, wastewater flows out little by little. The wastewater from the contactor 7 then flows along the surface of those other contactors which are positioned lower. In this way, trickling operation takes place on the surfaces of individual contactors. Meanwhile, air flows into each contactor 7 as wastewater is discharged. Thus, both inner and outer surfaces of the thin walled hollow contactor 7 from which wastewater has been discharged are now exposed to air over larger portions of their surface areas of contact.

On the inner and outer surfaces of the contactor 7 thus exposed to air, activity of aerobic biological organisms is stimulated. With the rotation of the drum 3, the biological contactor 7 is again submerged in wastewater, and air present in the contactor 7 is gradually released through one of the small openings 8 and replaced with wastewater. In this connection, it is noted that the release of air from the contactor 7 takes place when the contactor 7 is submerged in wastewater: air is discharged into wastewater in the form of bubble. Thereupon, wastewater in the tank 3 is aerated and activity of aerobic biological organisms in the wastewater is stimulated.

Above described proces of trickling and aeration operation performed by biological contactors 7 is diagramatically presented in FIG. 13. The figure illustrates the manner in which the relative position of two small openings 8,8 on each biological contactor 7 changes as the drum 3 rotates. To facilitate understanding, as a typical example a couple of biological contactors 7,7 whose respective pairs of small openings 8,8 differ in their relative position from each other are chosen for presentation. In actuality, however, a multiplicity of biological contactors 7 are arranged at random in the drum 3 and accordingly relative positions of individual pairs of small openings 8,8 on the contactors 7 are distributed at random. Therefore, the time phase at which individual biological contactors are alternately subjected to flow-in and flow-out of wastewater or air relative to the phase of rotation of the drum vary from contactor to contactor, so that when taken as a whole, the operation of the drum results in well-balanced trickling and filtration achievement. The fact that even with such random arrangement of contactors in the drum 3 well-balanced trickling and filtration results can be achieved indicates an advantage that the placement of contactors in the drum 3 requires less trouble.

Figure 7:
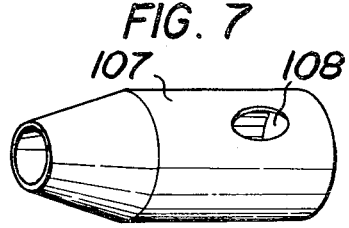
FIG. 7 is a perspective view illustrating still another form of biological contactor according to the invention.

Biological contactors 7 in ball-shaped form as shown in FIGS. 3 to 6 are most desirable, because they are easy to manufacture and because small openings on them can be positioned at random in the drum 3. However, biological contactors 7 need not necessarily be ball-shaped, but in other embodiments they may be bottle-shaped as illustrated in FIG. 7. For example, a small plastic bottle collected as waste may be utilized as such bottle-shaped contactor 107, with an opening 108 provided on side surface.

In the wastewater treatment apparatus of this invention, the biological contactors 7 packed in the drum 3 are of hollow structure, each with small openings thereon, and therefore, it is possible to provide each contactor with a subsidiary biological contactor of any suitable configuration inserted in the hollow portion thereof. For example, a fibrous sponge structure 11, made of saran fiber, as shown in FIG. 8 may be used for insertion into each contactor as a subsidiary contactor. By provision of such a subsidiary contactor 11 in the biological contactor 7 (FIG. 11), it is possible to give increased area of contact with air and wastewater and increased surface for biological growth and accumulation, hence increased purification ability.

Beside such fibrous sponge structure 11 as shown in FIG. 8, an open cell foamed structure of flexible synthetic resin (not shown), or a synthetic resin plate structure 111 as shown in FIGS. 9 and 12 or shaped net structure 211 as shown in FIG. 10 respectively may be used as subsidiary biological contactors as well.

As will be apparent from the above description, the wastewater treatment apparatus according to the invention performs wastewater purification operation in such manner that the drum 3 having a multiplicity of biological contactors 7, 107 of specific configuration packed therein are brought into contact alternately with wastewater 2 and the atmosphere as it runs at a low velocity, wherely growth and accumulation of aerobic biological organisms on both exterior and interior surfaces of the biological contactors are stimulated so that such biological organisms quickly ingest pollutants in wastewater, with the result that the pollutants are biologically oxidized and decomposed. Because of their specific configuration, the biological contactors 7,107, which constitute most important feature of the invention, are able to effectively perform aeration operation in wastewater 2 to obtain increased amount of dissolved oxygen in wastewater. In the atmosphere, they have a function to trickle wastewater in large amounts, thus facilitating growth and accumulation of aerobic biological organisms on their exterior and interir surfaces under most suitable conditions. Hence, the wastewater treatment arrangement according to the invention has an outstanding purification performance.

To clarify the outstanding performance of the wastewater treatment arrangement according to the invention, comparative test results on performance of said treatment arrangement and that of conventional disc-type rotating biological contactor system in the treatment of messroom wastewater are shown.

|  | pH | BOD ppm | COD ppm | SS mg/l |
|---|---|---|---|---|
| Raw wastewater | 6.5 | 410 | 86 | 152 |
| Treated water by Conventional disc-type rotating contactor system | 7.1 | 51 | 42 | 39 |
| (removal rate %) |  | (88) | (51) | (74) |
| Treated water by wirecloth-type rotating contactor system | 7.1 | 28 | 24 | 20 |
| (removal rate %) |  | (93) | (72) | (87) |
| Treated water by apparatus according to the present invention | 7.2 | 8 | 16 | 15 |
| (removal rate %) |  | (98) | (81) | (90) |

Figure 3:
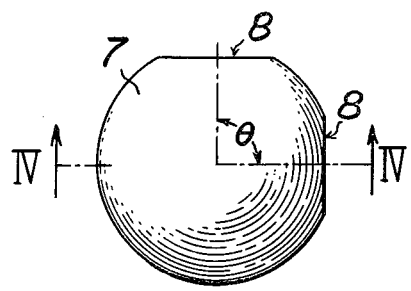
FIG. 3 is a front view of a biological contactor according to the invention.
Figure 4:
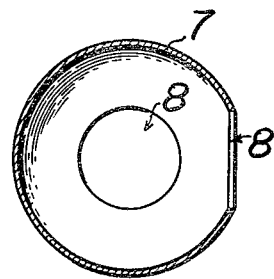
FIG. 4 is a section taken along line IV—IV in FIG. 3.

Notes:
1. "Conventional disc-type rotating contactor system" refers to a system utilizing a plurality of parallel biological contactor assemblies (disc-type) which are rotated, partially submerged in wastewater.
2. "Wirecloth-type rotating contactor system" refers to a system utilizing a rotating drum whose peripheral wall is of wirecloth construction, with fibrous sponge filled therein. The drum is partially submerged in wastewater.
3. "Apparatus according to the present invention" refers to an arrangement utilizing a rotating drum 3 in which hollow biological contactors 7 shown in FIGS. 3 and 4 are packed.

I claim:
1. An apparatus for wastewater treatment comprising a wastewater tank, a water pervious drum rotatable horizontally fixed mounted in the tank and submerged about one-half of its diameter in waste water in the tank and a multiplicity of biological contactors packed in the drum, said drum, at least its peripheral wall portion, being constructed of porous plate or woven metal wire so as to be water pervious, said biological contactors being of thin-walled hollow structure, formed of synthetic resins, each with only two small openings disposed at an angle of about 90° from the center of the hollow structure, and said plurality being sufficient and said contactors being sufficiently packed so as to prevent movement of said contactors within the drum.
2. The apparatus as set forth in claim 1 wherein said biological contactors are ball-shaped.
3. The apparatus as set forth in claim 2 wherein the peripheral surface of each said biological contactor has concave portions and convex portions.
4. The apparatus as set forth in claim 1 wherein each said biological contactor is bottle-shaped and its mouth forms one of its two small openings, with the other provided at a suitable location on the peripheral surface of the contactor.
5. The apparatus as set forth in claim 1, 2, 3, or 4 wherein a subsidiary biological contactor is provided in the hollow portion of each said biological contactor.
6. The apparatus as set forth in claim 5 wherein said subsidiary biological contactor is formed of fibrous sponge.
7. The apparatus as set forth in claim 5 wherein said subsidiary biological contactor is formed of open-cell foamed synthetic resin material.
8. The apparatus as set forth in claim 5 wherein said subsidiary biological contactor is of plate-shaped synthetic resin structure.
9. The apparatus as set forth in claim 5 wherein said subsidiary biological contactor is of reticulated synthetic resin structure.

* * * * *